US012017920B2

(12) United States Patent
Vecchio et al.

(10) Patent No.: US 12,017,920 B2
(45) Date of Patent: Jun. 25, 2024

(54) METALLIC MULTICOMPONENT CARBIDES

(71) Applicant: The Regents of the University of California, Oakland, CA (US)

(72) Inventors: Kenneth Vecchio, San Diego, CA (US); Tyler Harrington, New York, NY (US)

(73) Assignee: The Regents of the University of California, Oakland, CA (US)

( * ) Notice: Subject to any disclaimer, the term of this patent is extended or adjusted under 35 U.S.C. 154(b) by 818 days.

(21) Appl. No.: 17/094,337

(22) Filed: Nov. 10, 2020

(65) Prior Publication Data

US 2021/0147242 A1 May 20, 2021

Related U.S. Application Data

(60) Provisional application No. 62/935,780, filed on Nov. 15, 2019.

(51) Int. Cl.
*C01B 32/907* (2017.01)
*C04B 35/56* (2006.01)

(52) U.S. Cl.
CPC ........ *C01B 32/907* (2017.08); *C04B 35/5611* (2013.01)

(58) Field of Classification Search
CPC .......................... C04B 35/5611; C01B 32/907
See application file for complete search history.

(56) References Cited

FOREIGN PATENT DOCUMENTS

CN 110194667 A * 9/2019 ......... C04B 35/5607

OTHER PUBLICATIONS

Chen et al. CN110194667A English Translation (Year: 2019).*
Yan et al. Journal of the American Ceramic Society, 2018, 101, 448604491, May 14, 2018 (Year: 2018).*
Sarker et al. Nature Communications, 2018, 9, 4980 (Year: 2018).*
Widom, "Modeling the structure and thermodynamics of high-entropy alloys", Journal of Materials Research, Oct. 2018, pp. 2881-2898, vol. 33, No. 19, Materials Research Society.
Ye et al., "High-entropy alloy: challenges and prospects", Materials Today, Jul. 2016, pp. 349-362, vol. 19, No. 6, Elsevier Ltd.
Senkov et al., "Low-density, refractory multi-principal element alloys of the Cr—Nb—Ti—V—Zr system: Microstructure and phase analysis", Acta Materialia, 2013, pp. 1545-1557, vol. 61, Elsevier Ltd.
Von Rohr et al., "Effect of electron count and chemical complexity in the Ta—Nb—Hf—Zr—Ti high-entropy alloy superconductor", PNAS, 2016, pp. E7144-E7150, vol. 113, No. 36, National Academy of Sciences.
Bérardan et al., "Colossal dielectric constant in high entropy oxides", Physica Status Solidi Rapid Research Letters, 2016, pp. 328-333, vol. 10, No. 4, WILEY-VCH Verlag Gmbh & Co. KGaA, Weinheim.
Bérardan et al., "Room temperature lithium superionic conductivity in high entropy oxides", Journal of Materials Chemistry A, 2016, pp. 9536-9541, vol. 4, The Royal Society of Chemistry.
Castle et al., "Processing and Properties of High-Entropy Ultra-High Temperature Carbides", Scientific Reports, 2018, pp. 1-12, vol. 8, Springer Nature Limited.
Zhou et al., "High-entropy carbide: A novel class of multicomponent ceramics", Ceramics International, 2018, pp. 22014-22018, vol. 44, Elsevier.
Rohrer et al., "Challenges in Ceramic Science: A Report from the Workshop on Emerging Research Areas in Ceramic Science", Journal of the American Ceramic Society, 2012, pp. 3699-3712, vol. 95, No. 12, The American Ceramic Society.
Hong et al., "Prediction of the material with highest known melting point from ab initio molecular dynamics calculations", Physical Review B, 2015, pp. 1-6, vol. 92, American Physical Society.
Cedillos-Barraza et al., "Investigating the highest melting temperature materials: A laser melting study of the TaC—HfC system", 2016, pp. 1-11, vol. 6, Springer Nature Limited.
Harrington et al., "Phase stability and mechanical properties of novel high entropy transition metal carbides", Acta Materialia, 2019, pp. 271-280, vol. 166, Elsevier Ltd.
Sarker et al., "High-entropy high-hardness metal carbides discovered by entropy descriptors", Nature Communications, 2018, pp. 1-10, vol. 9, Springer Nature Limited.
Vecchio, Harrington et al., "Modeling and Synthesis of High-Entropy Refractory Carbides, Nitrides and Carbonitrides," Proceedings UHTC IV, No. 32 (2017).

* cited by examiner

*Primary Examiner* — Samir Shah
*Assistant Examiner* — Jordan W Taylor
(74) *Attorney, Agent, or Firm* — Greer, Burns & Crain, Ltd.; Steven P. Fallon

(57) ABSTRACT

A multicomponent carbide has at least five transition metals, and a valence electron concentration (VEC) is greater 8.80 electrons. Preferred off-equiatomic multicomponent carbides have five transition metals and a VEC of more than 8.80. Preferred equiatomic multicomponent carbides have five transition metals and a VEC of 9.00 or greater. The valence electron configuration is important for its relationship to the mechanical properties of carbides. Since carbon forms four bonds, when there are more than four valence electrons available from the metals, there are excess electrons in the system. This increases metallic character of bonding and therefore allows for more ductility and higher toughness.

3 Claims, No Drawings

METALLIC MULTICOMPONENT CARBIDES

PRIORITY CLAIM AND REFERENCE TO RELATED APPLICATION

The application claims priority under 35 U.S.C. § 119 and all applicable statutes and treaties from prior provisional application Ser. No. 62/935,780, which was filed Nov. 15, 2019, and is incorporated by reference herein.

STATEMENT OF GOVERNMENT INTEREST

This invention was made with government support under N00014-15-1-2863 awarded by the Office of Naval Research. The government has certain rights in the invention.

FIELD

A field of the invention is ceramics, and particularly high-temperature, high-hardness and wear-resistant ceramics.

BACKGROUND

Ultra-high temperature materials are generally defined as materials with melting temperatures ≥3300 K—a quality that is currently limited to a list of about 15 elements or compounds. The carbides, nitrides, oxides, and borides comprise a class of materials called ultra-high temperature ceramics (UHTCs). Example state of the art high-temperature ceramics include TaC, ZrC, HfC, NbC, TiC, $ZrB_2$, and $HfB_2$. Such materials are used, for example, as nuclear reactor linings as thin films, and leading edges for hypersonic flight in bulk form.

High-entropy materials having a highly disordered homogeneous crystalline single phase (potentially stabilized entirely by entropic contributions) continue to attract a great deal of research interest. See, e.g., Widom, M. Modeling the structure and thermodynamics of high-entropy alloys. J. Mater. Res. 33, 2881-2898 (2018). Reported properties include high strength (yield stress >1 GPa) combined with ductility [Ye, Y. F., Wang, Q., Lu, J., Liu, C. T. and Yang, Y. High-entropy alloy: challenges and prospects. Mater. Today 19, 349-362 (2016)], hardness [Senkov, O. N., Senkova, S. V., Woodward, C. and Miracle, D. B. Low-density, refractory multi-principal element alloys of the Cr—Nb—Ti—V—Zr system: microstructure and phase analysis. Acta Mater. 61, 1545-1557 (2013)], superconductivity [von Rohr, F., Winiarski, M. J., Tao, J., Klimczuk, T. and Cava, R. J. Effect of electron count and chemical complexity in the Ta—Nb—Hf—Zr—Ti high-entropy alloy superconductor. Proc. Natl Acad. Sci. USA 113, E7144-E7150 (2016)], colossal dielectric constant [Bérardan, D., Franger, S., Dragoe, D., Meena, A. K. and Dragoe, N. Colossal dielectric constant in high entropy oxides. Phys. Status Solidi RRL 10, 328-333 (2016)], and superionic conductivity [Bérardan, D., Franger, S., Meena, A. K. and Dragoe, N. Room temperature lithium superionic conductivity in high entropy oxides. J. Mater. Chem. A 4, 9536-9541 (2016)].

Entropy is thought to play a key-stabilizing role in high-entropy alloys, entropy-stabilized oxides, high-entropy borides, and high-entropy carbides. See, e.g., Castle, E., Csanádi, T., Grasso, S., Dusza, J. and Reece, M. Processing and properties of high-entropy ultra-high temperature carbides. Sci. Rep. 8, 8609 (2018); Zhou, J. et al. High-entropy carbide: a novel class of multicomponent ceramics. Ceramics Int. 44, 22014-22018 (2018). The latter three classes consist of disordered metal cation sublattices with several species at equi-concentration combined with oxide, boride, or carbide anion sublattices. These systems offer the potential to combine excellent thermo-mechanical properties and resilient thermodynamic stability given by entropy stabilization with the higher oxidation resistance of ceramics. Rohrer, G. S. et al. Challenges in ceramic science: a report from the workshop on emerging research areas in ceramic science. J. Am. Ceram. Soc. 95, 3699-3712 (2012). The resistance of disordered carbides to extreme heat, oxidation, and wear makes them promising ultra-high-temperature ceramics for thermal protection coatings in aerospace applications, and as high-hardness, relatively low-density high-performance drill bits and cutting tools in mining and industry. See, e.g., Hong, Q.-J. and van de Walle, A. Prediction of the material with highest known melting point from ab initio molecular dynamics calculations. Phys. Rev. B 92, 020104 (2015).

Super-hard transition metal carbides have been known since the 1930s to exhibit significant levels of solid solution, and to display high melting temperatures. $Ta_xHf_{1-x}C$ forms a homogeneous solid solution across all composition ranges, with $Ta_4HfC_5$ exhibiting one of the highest experimentally reported melting points (Tm~4263KTm~4263K). In this case, the two refractory metals randomly populate one of the two rock-salt sublattices. More recent measurements indicate that the maximum melting point of 4232 K occurs without Ta at the composition $HfC_{0.98}$. Cedillos-Barraza, O. et al. Investigating the highest melting temperature materials: a laser melting study of the TaC—HfC system. Sci. Rep. 6, 37962 (2016).

More species and configurations have to be considered to advance the art. Unfortunately, the lack of a rational, effective, and rapid method to find and characterize the disordered crystalline phase makes it impossible to pinpoint the right combination of species/compositions, and advancement has therefore continued by slow and relatively expensive trial and error.

Computationally, the hindrance in in-silico disordered materials development can be attributed to entropy—a very difficult quantity to parameterize when searching through the immense space of candidates (even with efficient computational methods, e.g., Monte Carlo and ab-initio lattice energies in the Wang-Landau or nested sampling formalisms). CALPHAD has also been applied successfully, although it is dependent on the availability of sufficient experimental data.

In 2017, we proposed a predictor, referred to as entropy forming ability (EFA) to predict formation of high entropy materials. See, Vecchio, Harrington et al., "Modeling and Synthesis of High-Entropy Refractory Carbides, Nitrides and Carbonitrides," Proceedings UHTC IV, No. 32 (2017). That abstract identified $(Hf_{0.2}Nb_{0.2}Ta_{0.2}Ti_{0.2}Zr_{0.2})C$, $(Hf_{0.2}Nb_{0.2}Ta_{0.2}Ti_{0.2}V_{0.2})C$, $(Hf_{0.2}Nb_{0.2}Ta_{0.2}Ti_{0.2}W_{0.2})C$, and $(Nb_{0.2}Ta_{0.2}Ti_{0.2}V_{0.2}W_{0.2})C$ as virtually single-phase, solid-solution compounds identified through the EFA. A problem with the EFA descriptor that we proposed in 2017 is that the descriptor relied upon properties that might be determined to have different values when determined by different artisans. Particularly, choice of functional for a DFT (density functional theory) calculation and the specifics of the definition of the material such as carbon vacancy concentration, can lead to significant differences in the calculated EFA values which will lead to reordering of the importance of the EFA values.

SUMMARY OF THE INVENTION

A preferred embodiment is a multicomponent carbide comprising at least five transition metals, and a valence electron concentration (VEC) is greater 8.80 electrons. Preferred off-equiatomic multicomponent carbides have five transition metals and a VEC of more than 8.80. Preferred equiatomic multicomponent carbides have five transition metals and a VEC of 9.00 or greater. We have identified that the valence electron configuration is important for its relationship to the mechanical properties of carbides. Since carbon forms four bonds, when there are more than four valence electrons available from the metals, there are excess electrons in the system. This increases metallic character of bonding and therefore allows for more ductility and higher toughness.

DETAILED DESCRIPTION OF THE PREFERRED EMBODIMENTS

Preferred embodiments of the invention provide multicomponent carbides having at least five transition metals having a valence electron concentration of more than 8.80, or at least 8.80 and including two Group VI transition metals. During making a preferred multicomponent carbides, the transition metal compositions are varied from equiatomic proportions to obtain a valence electron concentration of greater than 8.80 electrons per formula unit. The multi-component carbides of the invention are metallic in bonding confirmation and provide high ductility and toughness.

Preferred multicomponent carbides of the invention include Equiatomic compositions with a VEC of 9.00 or greater. Additional multicomponent carbides of the invention include Off-Equiatomic compositions with a VEC greater than 8.80 or at least 8.80 and including two Group VI transition metals.

The valence electron concentration (VEC) is defined as the total number of valence electrons per formula unit. For example, in TiC there are two s orbital and two d orbital electrons per titanium atom ($4s^2 3d^2$) and two s orbital and two p orbital electrons per carbon atom ($2s^2 2p^2$) for a total of 8.00 electrons/formula unit or a VEC=8. For a solid solution such as $(Zr_{0.5}Nb_{0.5})C$, there are two s orbital and two d orbital electrons per zirconium atom ($5s^2 4d^2$) and two s orbital and three d orbital electrons per niobium atom ($5s^1 4d^4$) and two s orbital and two p orbital electrons per carbon atom ($2s^2 2p^2$). So, there are (4*0.5)=2 from titanium, (5*0.5)=2.5 from niobium, and 4 from carbon for a total VEC of 8.50 electrons per formula unit. The inclusion of group VIB transition metals allows for high valence electron configurations to be achieved, for example $(Nb_{0.5}W_{0.5})C$ has a VEC of 9.50 electrons per formula unit.

For multicomponent carbides with five transition metals, we have identified the valence electron configuration is important for its relationship to the mechanical properties of carbides. Since carbon forms four bonds, when there are more than four valence electrons available from the metals, there are excess electrons in the system. This increases metallic character of bonding and therefore allows for more ductility and higher toughness.

Table 1 includes preferred equiatomic multicomponent carbides with five transition metals and a VEC of 9.00 or greater.

| Composition | VEC |
| --- | --- |
| $(Mo_{0.2}Nb_{0.2}Ta_{0.2}V_{0.2}W_{0.2})C$ | 9.40 |
| $(Mo_{0.2}Nb_{0.2}Ta_{0.2}Ti_{0.2}W_{0.2})C$ | 9.20 |
| $(Hf_{0.2}Mo_{0.2}Nb_{0.2}Ta_{0.2}W_{0.2})C$ | 9.20 |
| $(Mo_{0.2}Nb_{0.2}Ti_{0.2}V_{0.2}W_{0.2})C$ | 9.20 |
| $(Mo_{0.2}Ta_{0.2}Ti_{0.2}V_{0.2}W_{0.2})C$ | 9.20 |
| $(Mo_{0.2}Nb_{0.2}Ta_{0.2}W_{0.2}Zr_{0.2})C$ | 9.20 |
| $(Hf_{0.2}Mo_{0.2}Nb_{0.2}V_{0.2}W_{0.2})C$ | 9.20 |
| $(Hf_{0.2}Mo_{0.2}Ta_{0.2}V_{0.2}W_{0.2})C$ | 9.20 |
| $(Mo_{0.2}Nb_{0.2}V_{0.2}W_{0.2}Zr_{0.2})C$ | 9.20 |
| $(Mo_{0.2}Ta_{0.2}V_{0.2}W_{0.2}Zr_{0.2})C$ | 9.20 |
| $(Mo_{0.2}Nb_{0.2}Ta_{0.2}Ti_{0.2}V_{0.2})C$ | 9.00 |
| $(Nb_{0.2}Ta_{0.2}Ti_{0.2}V_{0.2}W_{0.2})C$ | 9.00 |
| $(Hf_{0.2}Mo_{0.2}Nb_{0.2}Ta_{0.2}V_{0.2})C$ | 9.00 |
| $(Hf_{0.2}Nb_{0.2}Ta_{0.2}V_{0.2}W_{0.2})C$ | 9.00 |
| $(Mo_{0.2}Nb_{0.2}Ta_{0.2}V_{0.2}Zr_{0.2})C$ | 9.00 |
| $(Nb_{0.2}Ta_{0.2}V_{0.2}W_{0.2}Zr_{0.2})C$ | 9.00 |
| $(Hf_{0.2}Mo_{0.2}Nb_{0.2}Ti_{0.2}W_{0.2})C$ | 9.00 |
| $(Hf_{0.2}Mo_{0.2}Ta_{0.2}Ti_{0.2}W_{0.2})C$ | 9.00 |
| $(Hf_{0.2}Mo_{0.2}Nb_{0.2}W_{0.2}Zr_{0.2})C$ | 9.00 |
| $(Mo_{0.2}Nb_{0.2}Ti_{0.2}V_{0.2}Zr_{0.2})C$ | 9.00 |
| $(Mo_{0.2}Ta_{0.2}Ti_{0.2}W_{0.2}Zr_{0.2})C$ | 9.00 |
| $(Hf_{0.2}Mo_{0.2}Ta_{0.2}W_{0.2}Zr_{0.2})C$ | 9.00 |
| $(Hf_{0.2}Mo_{0.2}Ti_{0.2}V_{0.2}W_{0.2})C$ | 9.00 |
| $(Mo_{0.2}Ti_{0.2}V_{0.2}W_{0.2}Zr_{0.2})C$ | 9.00 |
| $(Hf_{0.2}Mo_{0.2}V_{0.2}W_{0.2}Zr_{0.2})C$ | 9.00 |

Table 2 includes preferred off-equiatomic multicomponent carbides with five transition metals and a VEC of more than 8.80.

| Composition | VEC |
| --- | --- |
| $(Hf_{0.18}Mo_{0.28}Nb_{0.18}Ta_{0.18}Ti_{0.18})C$ | 8.92 |
| $(Hf_{0.18}Mo_{0.28}Nb_{0.18}Ta_{0.18}Zr_{0.18})C$ | 8.92 |
| $(Hf_{0.18}Mo_{0.28}Nb_{0.18}Ti_{0.18}V_{0.18})C$ | 8.92 |
| $(Mo_{0.28}Nb_{0.18}Ta_{0.18}Ti_{0.18}Zr_{0.18})C$ | 8.92 |
| $(Hf_{0.18}Mo_{0.28}Ta_{0.18}Ti_{0.18}V_{0.18})C$ | 8.92 |
| $(Hf_{0.18}Nb_{0.18}Ta_{0.18}Ti_{0.18}W_{0.28})C$ | 8.92 |
| $(Hf_{0.18}Nb_{0.18}Ta_{0.18}W_{0.28}Zr_{0.18})C$ | 8.92 |
| $(Hf_{0.18}Nb_{0.18}Ti_{0.18}V_{0.18}W_{0.28})C$ | 8.92 |
| $(Mo_{0.28}Nb_{0.18}Ti_{0.18}V_{0.18}Zr_{0.18})C$ | 8.92 |
| $(Mo_{0.28}Ta_{0.18}Ti_{0.18}V_{0.18}Zr_{0.18})C$ | 8.92 |
| $(Nb_{0.18}Ta_{0.18}Ti_{0.18}W_{0.28}Zr_{0.18})C$ | 8.92 |
| $(Hf_{0.18}Ta_{0.18}Ti_{0.18}V_{0.18}W_{0.28})C$ | 8.92 |
| $(Hf_{0.18}Mo_{0.28}Nb_{0.18}V_{0.18}Zr_{0.18})C$ | 8.92 |
| $(Hf_{0.18}Mo_{0.28}Ta_{0.18}V_{0.18}Zr_{0.18})C$ | 8.92 |
| $(Nb_{0.18}Ti_{0.18}V_{0.18}W_{0.28}Zr_{0.18})C$ | 8.92 |
| $(Ta_{0.18}Ti_{0.18}V_{0.18}W_{0.28}Zr_{0.18})C$ | 8.92 |
| $(Hf_{0.18}Nb_{0.18}V_{0.18}W_{0.28}Zr_{0.18})C$ | 8.92 |
| $(Hf_{0.18}Ta_{0.18}V_{0.18}W_{0.28}Zr_{0.18})C$ | 8.92 |

Table 3 consists of the preferred off-equiatomic multi-component carbide with five transition metals, of which two are Group VI elements.

| Composition | VEC |
| --- | --- |
| $(Hf_{0.2}Mo_{0.2}Ti_{0.2}W_{0.2}Zr_{0.2})C$ | 8.80 |

The preferred compositions are preferably made by mixing the proper ratios of the corresponding 5 binary carbides, ball milling them together and then sintering at suitable temperature and pressure to achieve a high density product. Alternatively, the materials can be fabricated by mixing the proper ratios of the metal powders with the appropriate amounts of carbon to achieve the monocarbide composition, followed by ball milling and sintering. In a further embodiment of the synthesis route, the metal oxides of the 5 metal species can be combined with appropriate amounts of carbon to achieve a reduction of the oxides to metallic species and subsequent carbide formation using similar sintering techniques.

Table 4 consists of additional preferred multicomponent carbide with five transition metals with at least on Group VI element, and the most preferred having two Group VI elements and a VEC of 9.4:

| Composition | |
|---|---|
| $(Hf_{0.2}Ta_{0.2}Ti_{0.2}W_{0.2}Zr_{0.2})C.$ | 3 IV, 1 V, 1 VI = VEC 8.6 |
| $(Mo_{0.2}Nb_{0.2}Ta_{0.2}Ti_{0.2}V_{0.2})C$ | 1 IV, 3 V, 1 VI = VEC 9 |
| $(Hf_{0.2}Mo_{0.2}Ta_{0.2}Ti_{0.2}Zr_{0.2})C.$ | 3 IV, 1 V, 1 VI = VEC 8.6 |
| $(Hf_{0.2}Mo_{0.2}Nb_{0.2}Ta_{0.2}Ti_{0.2})C.$ | 2 IV, 2 V, 1 VI = VEC 8.8 |
| $(Mo_{0.2}Nb_{0.2}Ta_{0.2}V_{0.2}W_{0.2})C$ | 0 IV, 3 V, 2 VI = VEC 9.4 |

Some of the compositions have been made and tested. Selected properties demonstrate the surprising and superior hardness of many of the compositions over the hardness predicted by a rule-of-mixtures approach of the corresponding binary carbide compositions.

The present approach provides a new method for designing super-hard materials. The present methods provide a foundation for a long-sought enabler of accelerated design for high-entropy ceramics with enhanced properties for a wide range of different technological applications.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A metallic multicomponent carbide comprising one of the following compositions:

| Composition | VEC |
|---|---|
| $(Hf_{0.18}Mo_{0.28}Nb_{0.18}Ta_{0.18}Ti_{0.18})$ C | 8.92 |
| $(Hf_{0.18}Mo_{0.28}Nb_{0.18}Ta_{0.18}Zr_{0.18})C$ | 8.92 |
| $(Hf_{0.18}Mo_{0.28}Nb_{0.18}Ti_{0.18}V_{0.18})C$ | 8.92 |
| $(Mo_{0.28}Nb_{0.18}Ta_{0.18}Ti_{0.18}Zr_{0.18})C$ | 8.92 |
| $(Hf_{0.18}Mo_{0.28}Ta_{0.18}Ti_{0.18}V_{0.18})C$ | 8.92 |
| $(Hf_{0.18}Nb_{0.18}Ta_{0.18}Ti_{0.18}W_{0.28})C$ | 8.92 |
| $(Hf_{0.18}Nb_{0.18}Ta_{0.18}W_{0.28}Zr_{0.18})C$ | 8.92 |
| $(Hf_{0.18}Nb_{0.18}Ti_{0.18}V_{0.18}W_{0.28})C$ | 8.92 |
| $(Mo_{0.28}Nb_{0.18}Ti_{0.18}V_{0.18}Zr_{0.18})C$ | 8.92 |
| $(Mo_{0.28}Ta_{0.18}Ti_{0.18}V_{0.18}Zr_{0.18})C$ | 8.92 |
| $(Nb_{0.18}Ta_{0.18}Ti_{0.18}W_{0.28}Zr_{0.18})C$ | 8.92 |
| $(Hf_{0.18}Ta_{0.18}Ti_{0.18}V_{0.18}W_{0.28})C$ | 8.92 |
| $(Hf_{0.18}Mo_{0.28}Nb_{0.18}V_{0.18}Zr_{0.18})C$ | 8.92 |
| $(Hf_{0.18}Mo_{0.28}Ta_{0.18}V_{0.18}Zr_{0.18})C$ | 8.92 |
| $(Nb_{0.18}Ti_{0.18}V_{0.18}W_{0.28}Zr_{0.18})C$ | 8.92 |
| $(Ta_{0.18}Ti_{0.18}V_{0.18}W_{0.28}Zr_{0.18})C$ | 8.92 |
| $(Hf_{0.18}Nb_{0.18}V_{0.18}W_{0.28}Zr_{0.18})C$ | 8.92 |
| $(Hf_{0.18}Ta_{0.18}V_{0.18}W_{0.28}Zr_{0.18})C$ | 8.92 | wherein the valence electron concentration (VEC) is greater than 8.80 electrons and wherein the composition has transition metal components varied from equiatomic proportions to obtain the VEC of greater than 8.80 electrons.

2. A metallic multicomponent carbide consisting of (Hf0.2Mo0.2Ti0.2W0.2Zr0.2)C, wherein a valence electron concentration (VEC) is greater than 8.80 electrons.

3. A metallic multicomponent carbide consisting of (Mo0.2Nb0.2Ta0.2V0.2W0.2)C, wherein a valence electron concentration (VEC) is greater than 8.80 electrons.

* * * * *